US012604859B2

(12) United States Patent (10) Patent No.: US 12,604,859 B2

Song (45) Date of Patent: Apr. 21, 2026

(54) CONNECTING STRUCTURE FOR CAT FURNITURE ITEM AND CAT FURNITURE ITEM

(71) Applicant: ZIEL HOME FURNISHING TECHNOLOGY CO., LTD., Zhengzhou (CN)

(72) Inventor: Chuan Song, Zhengzhou (CN)

(73) Assignee: ZIEL HOME FURNISHING TECHNOLOGY CO., LTD., Zhengzhou (CN)

( * ) Notice: Subject to any disclaimer, the term of this patent is extended or adjusted under 35 U.S.C. 154(b) by 279 days.

(21) Appl. No.: 18/356,363

(22) Filed: Jul. 21, 2023

(65) Prior Publication Data

US 2024/0107976 A1 Apr. 4, 2024

Related U.S. Application Data

(63) Continuation of application No. PCT/CN2023/083326, filed on Mar. 23, 2023.

(30) Foreign Application Priority Data

Sep. 30, 2022 (CN) .......................... 202222649750.4
Sep. 30, 2022 (CN) .......................... 202222649807.0
(Continued)

(51) Int. Cl.
*A01K 1/035* (2006.01)
*F16B 9/00* (2006.01)
(52) U.S. Cl.
CPC ................ *A01K 1/035* (2013.01); *F16B 9/09* (2018.08)

(58) Field of Classification Search
CPC .. A01K 15/024; A01K 15/025; A01K 15/035; F16B 7/0426; F16B 7/22;
(Continued)

(56) References Cited

U.S. PATENT DOCUMENTS 197,667 A * 11/1877 Roberts ..................... F16B 7/22
403/339
1,132,318 A * 3/1915 Feder ........................ F16B 7/22
33/376
(Continued)

FOREIGN PATENT DOCUMENTS

CN 2168981 Y 6/1994
CN 103982494 A 8/2014
(Continued)

*Primary Examiner* — Amber R Anderson
(74) *Attorney, Agent, or Firm* — Westbridge IP LLC

(57) ABSTRACT

Disclosed are a connecting structure and a cat furniture item. The connecting structure includes: a first connector, configured to be fixed to one of an end surface of a column and a panel, and provided with at least one slot; a second connector, configured to be fixed to the other one, and provided with at least one block. The at least one block is configured to engage with the at least one slot respectively to achieve a detachable connection. Based on the connecting structure, the efficiency of disassembly and assembly between various components of the cat furniture item can be improved. In addition, additional fixing components such as screws are unnecessary, so that the accidental injury caused by exposure of screws can be fundamentally avoided.

12 Claims, 16 Drawing Sheets

(30)       Foreign Application Priority Data

Sep. 30, 2022   (CN) ......................... 202222649808.5
Nov. 28, 2022   (CN) ......................... 202223200241.X

(58) Field of Classification Search
CPC .... F16B 9/02; F16B 9/052; F16B 9/09; F16B
2200/30; F16B 2200/50
USPC ................................................. 119/702, 706
See application file for complete search history.

(56)                References Cited

U.S. PATENT DOCUMENTS

| | | | | |
|---|---|---|---|---|
| 2,283,974 | A | * | 5/1942 | Dillon ................... F16L 37/252 |
| | | | | 285/332.1 |
| 2,334,449 | A | * | 11/1943 | Sherman ................... F16B 3/00 |
| | | | | 403/331 |
| 3,510,096 | A | * | 5/1970 | Mutchnik ............... F16B 12/48 |
| | | | | 403/189 |
| 4,564,732 | A | * | 1/1986 | Lancaster ............ H01H 13/807 |
| | | | | 403/381 |
| 4,640,478 | A | * | 2/1987 | Leigh-Monstevens ...................... |
| | | | | F16D 25/12 |
| | | | | 248/27.1 |
| 5,433,416 | A | * | 7/1995 | Johnson ............... B65D 23/003 |
| | | | | 403/381 |
| 5,577,466 | A | * | 11/1996 | Luxford ................. A01K 1/035 |
| | | | | 119/485 |
| 11,064,676 | B2 | * | 7/2021 | Goldman ............... A01K 1/035 |
| 2003/0231925 | A1 | * | 12/2003 | Chen ......................... E04C 3/06 |
| | | | | 403/294 |
| 2008/0276878 | A1 | * | 11/2008 | Ebert ................... A01K 15/024 |
| | | | | 119/706 |
| 2014/0033987 | A1 | * | 2/2014 | Hoffman ................. A01K 1/035 |
| | | | | 119/706 |
| 2015/0093184 | A1 | * | 4/2015 | Henry ................... E04B 1/2604 |
| | | | | 403/187 |
| 2020/0315129 | A1 | * | 10/2020 | Kumetz ................. A01K 1/035 |
| 2021/0329887 | A1 | * | 10/2021 | Kellogg .................... F16B 9/02 |
| 2023/0102402 | A1 | * | 3/2023 | Wood ..................... E04B 1/388 |
| | | | | 403/375 |

FOREIGN PATENT DOCUMENTS

| | | |
|---|---|---|
| CN | 110005671 A | 7/2019 |
| CN | 212672174 U | 3/2021 |
| CN | 215992346 U | 3/2022 |
| EP | 2661961 A1 | 11/2013 |

* cited by examiner

3

1

2

6

CONNECTING STRUCTURE FOR CAT FURNITURE ITEM AND CAT FURNITURE ITEM

CROSS-REFERENCE TO RELATED APPLICATIONS

The present application is a continuation of International Application No. PCT/CN2023/083326, filed on Mar. 23, 2023, which claims priority to Chinese Patent Application No. CN202222649808.5, filed on Sep. 30, 2022, Chinese Patent Application No. CN202222649807.0, filed on Sep. 30, 2022, Chinese Patent Application No. CN202222649750.4, filed on Sep. 30, 2022, and Chinese Patent Application No. CN202223200241.X, filed on Nov. 28, 2022. The disclosures of the aforementioned applications are hereby incorporated by reference in their entireties.

TECHNICAL FIELD

The present disclosure relates to the technical field of furniture, and in particular, to a connecting structure for a cat furniture item and a cat furniture item equipped with the connecting structure.

BACKGROUND

With the development of technology and the diversification of consumer demand, various types of cat furniture items have emerged on the market, such as cat climbing frames, cat grabbing posts, and cat ladders. Existing cat furniture items are commonly designed as a modular structure, in which each component is placed or transported separately during transportation, and then assembled after reaching the destination.

To make assembled cat furniture items firm, screws are commonly used in existing cat furniture items to securely connect components for assembly. Therefore, for a cat furniture item, the screws should be removed before separating the components when transporting the cat furniture item again. However, damages often occur on the cat furniture item when removing screws. In addition, the screws might expose due to frequent collisions by pets during the use of the cat furniture. This not only leads to cats injuries, but also leads to poor stability of cat furniture.

SUMMARY

To solve the above problems, the present disclosure provides a connecting structure for a cat furniture item and a cat furniture item.

According to a first aspect of the present disclosure, a connecting structure for a cat furniture item is provided, and the cat furniture item includes the connecting structure, a column, and a panel. The connecting structure includes: a first connector, configured to be fixed to one of the panel and an end surface of the column, and provided with at least one slot; and a second connector, configured to be fixed to the other of the panel and the end surface of the column, and provided with at least one block. The at least one block is configured to engage with the at least one slot respectively to achieve a detachable connection between the first connector and the second connector.

In a first implementation of the first aspect, the at least one slot includes a first square slot and a second square slot, which are disposed at an interval; the at least one block includes a first square block and a second square block, which are disposed at an interval; and the first square block is configured to be inserted into the first square slot to engage with the first square slot, and the second square block is configured to be inserted into the second square slot to engage with the second square slot.

In a second implementation of the first aspect, the at least one block includes a T-shaped block, an end of the T-shaped block is provided with a stop block, the at least one slot includes a slot adapted to the T-shaped block, and the T-shaped block is configured to be inserted into the slot to engage with the slot; and the first connector is further provided with a stop groove located at an end of the slot, and the stop block is configured to be inserted into the stop groove.

In a third implementation of the first aspect, the at least one slot includes a first arc-shaped slot and a second arc-shaped slot, the first arc-shaped slot and the second arc-shaped slot are oppositely disposed. The at least one block includes a first block and a second block. The first block is inserted into the first arc-shaped slot to engage with the first arc-shaped slot. The second block is inserted into the second arc-shaped slot to engage with the second arc-shaped slot.

According to a second aspect of the present disclosure, a cat furniture item is provided, and the cat furniture item includes a column, a panel, and a connecting structure according to the first aspect of the present disclosure, where the connecting structure is used to connect the column and panel.

Based on the connecting structure for cat furniture and the cat furniture according to the present disclosure, the efficiency of disassembly and assembly can be effectively improved by optimizing the connecting method between various components of the cat furniture; and the risk of screw exposure or screw loosening during use can be avoided, so that the reliability and safety of the product can be improved.

DETAILED DESCRIPTION OF THE EMBODIMENTS

To make the purpose, technical means, and advantages of the present disclosure more clearly, a detailed description of the present disclosure is given below with reference to the drawings.

It should be noted that the connecting structure for cat furniture provided by the present disclosure can be used to connect components of cat furniture, as well as components of human furniture. For example, cat furniture can include cat climbing frames, cat grabbing posts, cat ladders and so on, while human furniture can include side tables for children and so on.

Figure 1:
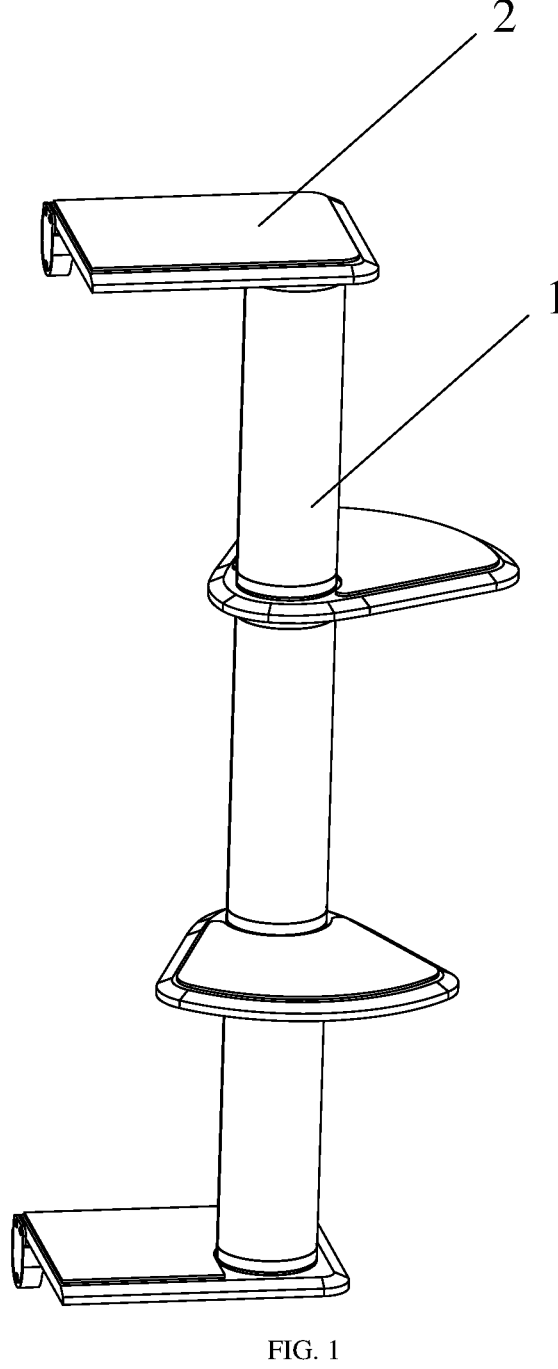
FIG. 1 is a structural schematic diagram of a cat furniture item according to the present disclosure.

A cat furniture item is an exemplary application scenario of a connecting structure provided by the present disclosure. As shown in FIG. 1, the cat furniture item may include a column 1, a panel 2, and a connecting structure.

The connecting structure may include a first connector 3 and a second connector 6. The first connector 3 is configured to be fixed to one of an end surface of the column 1 and the panel 2, and the second connector 6 is configured to be fixed to the other of the end surface of the column 1 and the panel 2. In other words, the first connector 3 and the second connector 6 are fixed to different components, so that two different components can be connected by the connection between the first connector 3 and the second connector 6.

Specifically, the first connector 3 is provided with at least one slot, and the second connector 6 is provided with at least one block. The at least one block of the second connector 6 is configured to engage with the at least one slot of the first connector 3 respectively to achieve a detachable connection between the first connector 3 and the second connector 6.

The connecting structure provided by the present disclosure can effectively improve the convenience of assembly and disassembly operations between various components of a cat furniture item through the connecting method of engaging the first connector and the second connector. In addition, additional fixing components such as screws are unnecessary, so that the accidental injury caused by exposure of screws during prolonged use can be fundamentally avoided.

Figure 8:
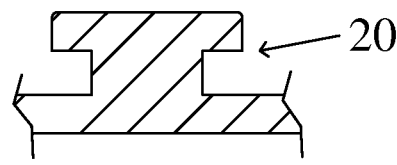
FIG. 8 is a schematic cross-sectional diagram taken along the A-A line in FIG. 7.
Figure 9:
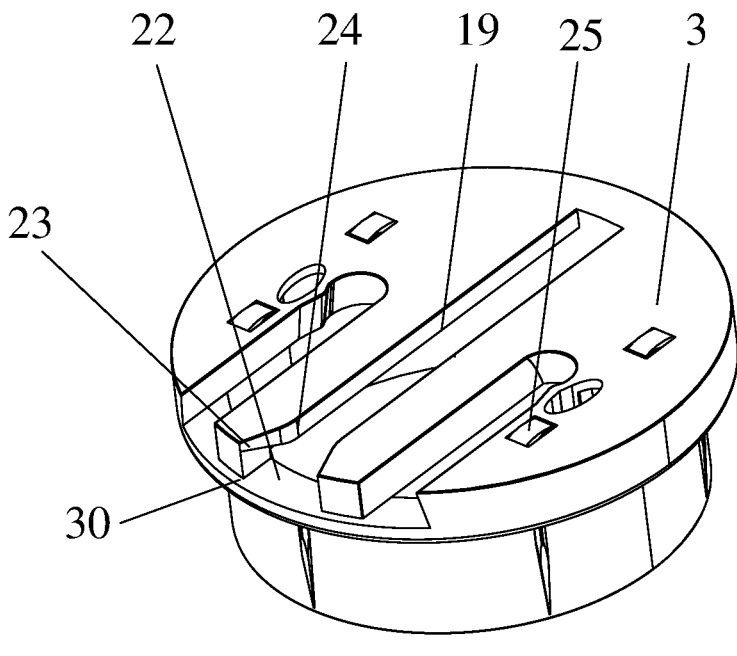
FIG. 9 is a schematic perspective diagram of the first connector shown in FIG. 6.
Figure 10:
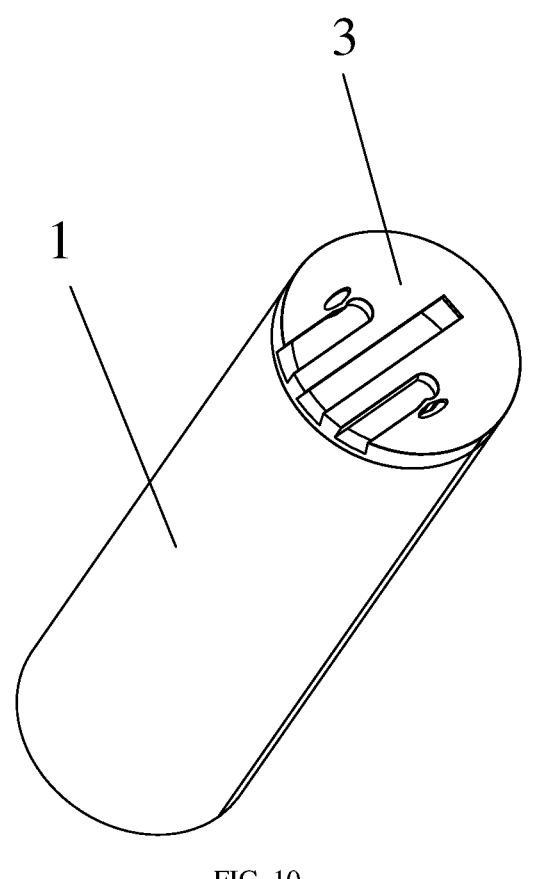
FIG. 10 is a schematic diagram of the first connector shown in FIG. 5 fixedly connected to an end surface of the column of the cat furniture item shown in FIG. 1.
Figure 11:
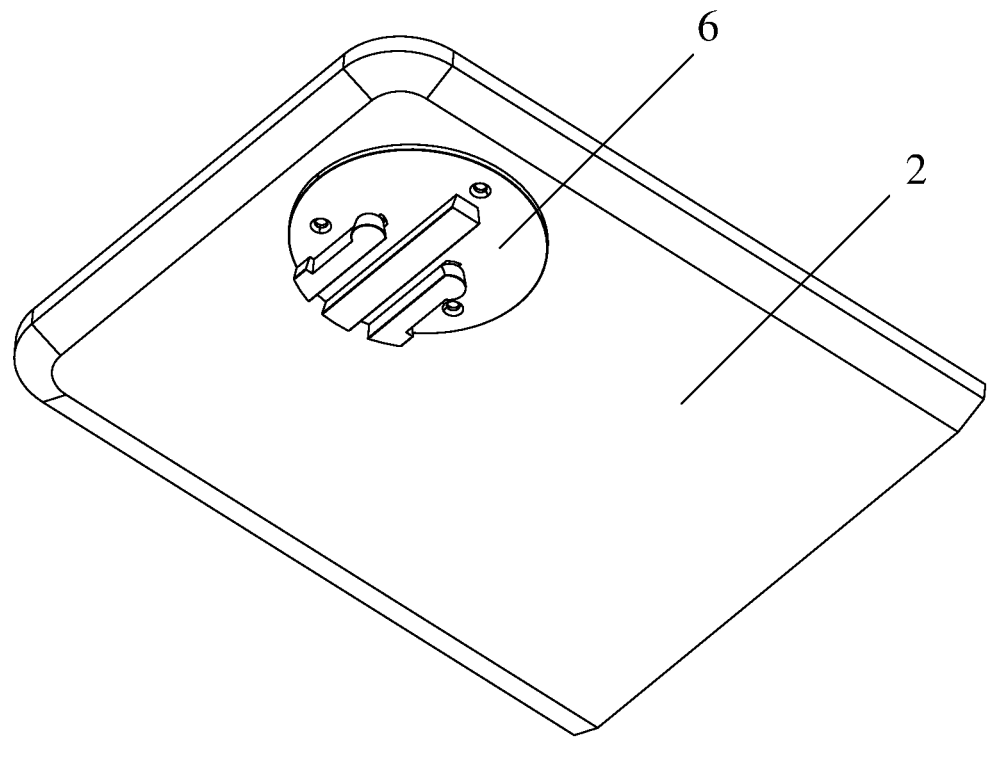
FIG. 11 is a schematic diagram of the second connector shown in FIG. 4 fixedly connected to the panel of the cat furniture item shown in FIG. 1.
Figure 12:
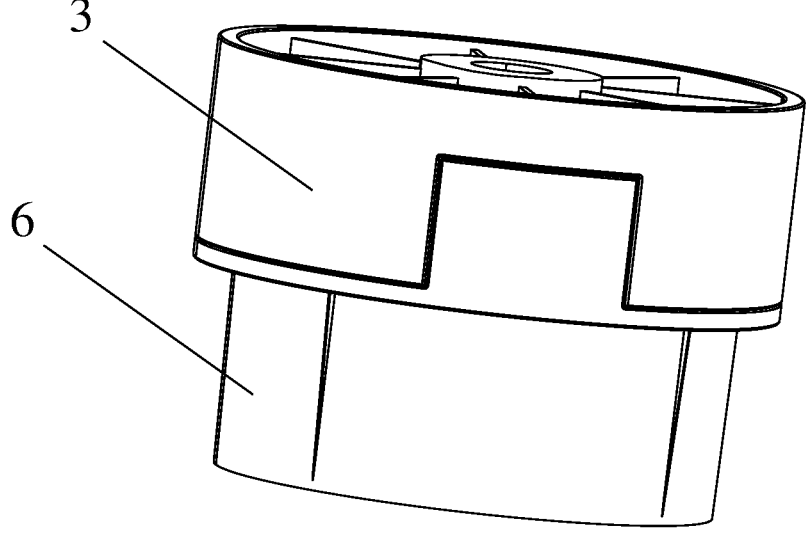
FIG. 12 is a schematic diagram of a connecting structure, for the cat furniture item shown in FIG. 1, according to another implementation of the present disclosure.

The connecting structures show in FIGS. 2 to 11 are based on the first implementation of the present disclosure, which can be applied, for example, to the cat furniture item shown in FIG. 1 as the connecting structure therein. For example, with reference to the application scenario shown in FIG. 1, as shown in FIGS. 10 and 11, the first connector 3 may be fixed to the end surface of the column 1, and the second connector 6 may be fixed to the panel 2. Therefore, the connection between the column 1 and the panel 2 can be achieved by connecting the first connector 3 and the second connector 6.

Figure 3:
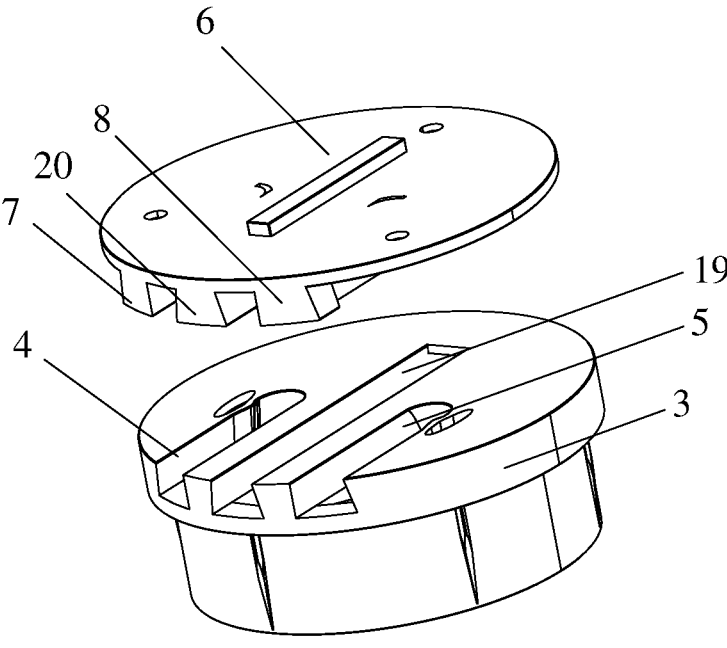
FIG. 3 is an exploded diagram of the connecting structure shown in FIG. 2.
Figure 4:
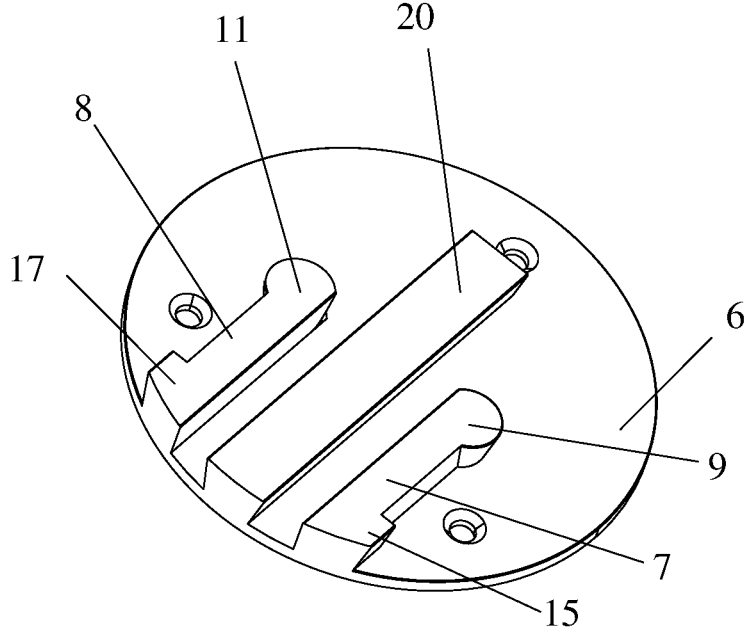
FIG. 4 is a schematic diagram of a second connector of the connecting structure in FIG. 2.

In some embodiments, as shown in FIG. 3, the at least one slot of the first connector 3 includes a first square slot 4 and a second square slot 5, which are disposed at intervals. Correspondingly, as shown in FIG. 4, the at least one block of the second connector 6 includes a first square block 7 and a second square block 8, which are disposed at intervals. During connecting, the first square block 7 can be inserted into the first square slot 4 to engage with the first square slot 4, and the second square block 8 can be inserted into the second square slot 5 to engage with the second square slot 5.

Exemplarily, as shown in FIGS. 10-11, the first connector 3 can be fixedly connected to the end surface of the column 1, and the second connector 6 can be fixedly connected to the panel 2. At this time, the first connector 3 is provided with a first square slot 4 and a second square slot 5, which are set relatively, and the second connector 6 is provided with a first square block 7 and a second square block 8. The connection between column 1 and panel 2 can be achieved by engaging the first square block 7 with the first square slot 4 and engaging the second square block 8 with the second square slot 5.

Furthermore, the disassembly can be achieved by pushing the first square block 7 from the first square slot 4 and pushing the second square block 8 from the second square slot 5, so that the efficiency of disassembly and assembly can be greatly improved.

According to the connecting structure provided by the embodiment, by using a shape-matched square slot and square block, the first connector and the second connector can be connected by a simple pushing in, and connected first connector and second connector can be separated through a simple pushing out, so that the efficiency of components disassembly and assembly can be effectively improved.

Furthermore, by oppositely disposing the first square slot and the second square slot, a firmly connected between each component can be ensured.

Figure 2:
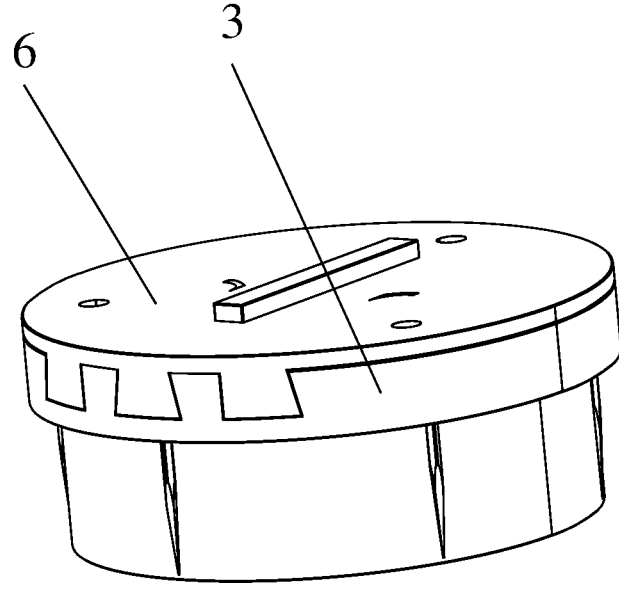
FIG. 2 is a schematic diagram of a connecting structure for the cat furniture item in FIG. 1.

As shown in FIGS. 2-3, in some embodiments of the present disclosure, the first square slot 4 may adopt a wedge shape with a gradually decreasing width from its bottom to its top. To match the shape of the first square slot 4, the first square block 7 may adopt a wedge shape with a gradually increasing width from its bottom to its top. Similarly, the second square slot 5 may also adopt a wedge shape with a gradually decreasing width from its bottom to its top, while the second square block 8 may adopt a wedge shape with a gradually increasing width from its bottom to its top to match the shape of the second square slot 5.

According to the connecting structure provided by the embodiment, the adoption of a matched wedge-shaped structure of a block and a slot can make the engaging between the two more firm and not easy to slip, so that the reliability of the connecting structure can be effectively improved, and thereby improving the stability of the assembled a cat furniture item.

Optionally, as shown in FIG. 4, the at least one block of the second connector 6 may also include a first circular block 9 and a second circular block 11, where the first circular block 9 is located at an inner end of the first square block 7, and the second circular block 11 is located at an inner end of the second square block 8. Correspondingly, as shown in FIG. 5, the at least one slot of the first connector 3 may also include a first circular slot 10 and a second circular slot 12, wherein the first circular slot 10 is located at an inner end of the first square slot 4, and the second circular slot 12 is located at an inner end of the second square slot 5.

During connecting, the first circular block 9 may be inserted into the first circular slot 10 to engage with the first circular slot 10, and the second circular block 11 may be inserted into the second circular slot 12 to engage with the second circular slot 12.

Therefore, the circular slot may also limit and block the circular bump while ensuring a more secure connection between the first connector and the second connector, thus preventing the bump from sliding out from the other end of the slot, effectively preventing the detachment between components connected by the connecting structure, and ensuring the stability of the furniture.

Figure 5:
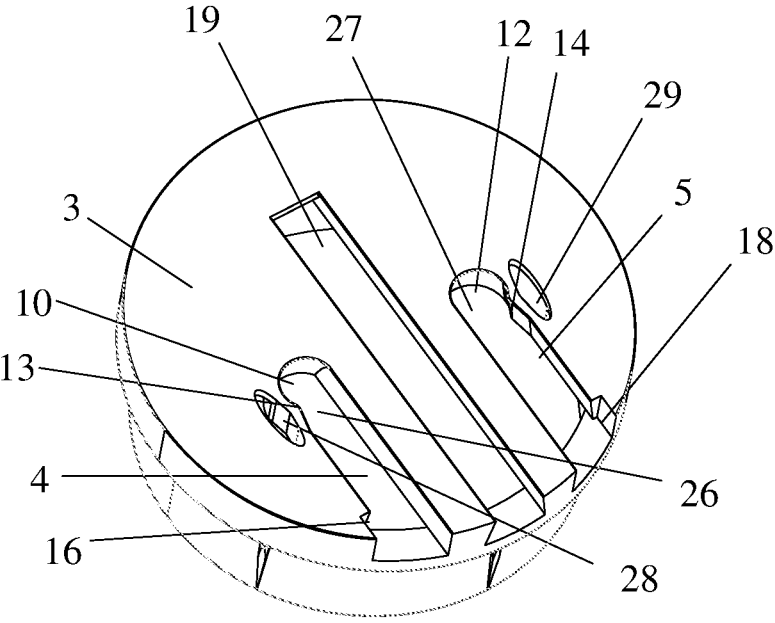
FIG. 5 is a schematic diagram of a first connector of the connecting structure in FIG. 2.

Optionally, as shown in FIG. 5, the connection between the first square slot 4 and the first circular slot 10 is provided with a first narrow region 26, and the connection between the second square slot 5 and the second circular slot 12 is provided with a second narrow region 27. Where the first narrow region 26 is provided with a first convex portion 13, which is configured to make the first narrow region 26 narrower than the first square slot 4 and the first circular slot 10; the second narrow region 27 is provided with a second convex portion 14, which is configured to make the second narrow region 27 narrower than the second square slot 5 and second circular slot 12. Exemplarily, the first convex portion 13 and/or the convex portion 14 may be provided with a circular chamfer.

Therefore, by setting a convex portion in the slot, a greater friction can be generated between the convex portion and the block in the slot when the first connector and the second connector are connected, so that the block cannot easily slide out of the slot, and the reliability of the connecting structure can be further improved.

Figure 6:
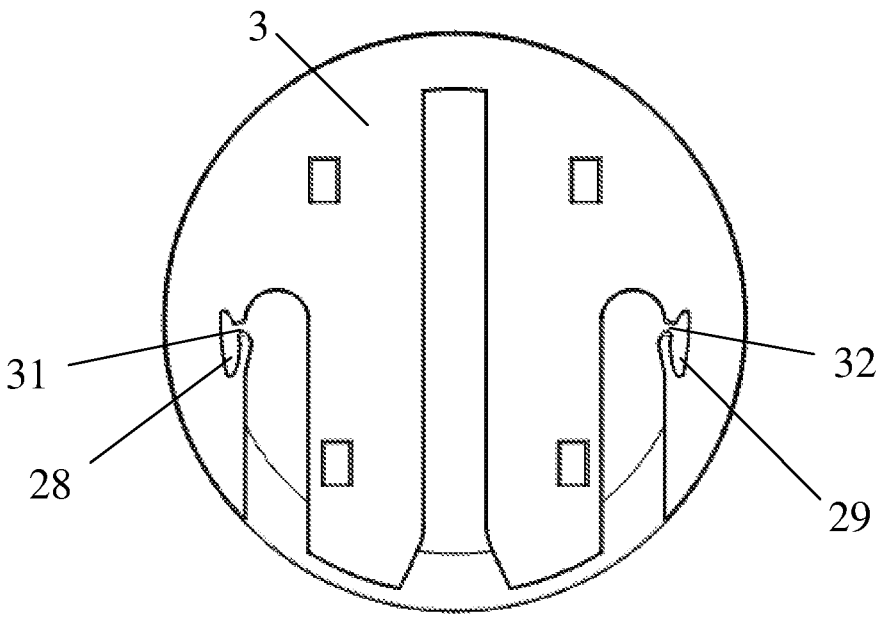
FIG. 6 is a schematic diagram of a first connector of a connecting structure according to another embodiment of the present disclosure.

Furthermore, as shown in FIGS. 5-6, in some embodiments, the first connector 3 may also be provided with a first weakening portion 28 and a second weakening portion 29. The first weakening portion 28 may be a first weakening hole 28 or a first weakening groove 28, and the second weakening portion 29 may be a second weakening hole 29 or a second weakening groove 29.

Specifically, the first weakening portion 28 is adjacent to the first convex portion 13, so that the first convex portion 13 is easily deformed when pressed by the first circular block 9 sliding from the first square slot 4 to the first circular slot 10. Similarly, the second weakening portion 29 is adjacent to the second convex portion 14, so that the second convex portion 14 is easily deformed when pressed by the second circular block 11 sliding from the second square slot 5 to the second circular slot 12.

During the connecting process, when the block enters the slot and reaches a narrow region, the convex portion will be squeezed by the block. In the embodiment, by setting a weakening portion near the convex portion, the weakening portion can provide deformation space for the convex portion, so that the deformation becomes easier when the convex portion is pressed, thus making room for sliding of the block, and facilitating the circular block at the end of the block to slide to the circular slot at the end of the slot.

Furthermore, in some preferred embodiments, as shown in FIG. 6, the first connector 3 may also be provided with a first narrow groove 31 and a second narrow groove 32. The first narrow groove 31 extends from the first weakening portion 28 to the first circular slot 10, and the second narrow groove 32 extends from the second weakening portion 29 to the second circular slot 12. Therefore, by improving the structure of the weakening portion, the deformation of convex portion becomes easier, so that the circular block can reach the circular slot more smoothly during connecting, and at the same time, it is possible to reduce the loss caused by the friction between the slot and the block.

Optionally, the maximum width of the circular block may be greater than the width of the square block, and the width of the square block may match the width of the narrow region in the slot. In other words, the convex portion is no longer compressed by the circular block when the circular block at the end of the block slides to the circular slot at the end of the slot, and may completely or partially restore to the state before deformation in the space provided by the square block. In addition, the convex portion may restrict the circular block in the circular slot, so that a large external force is needed for the circular block to escape from the circular slot, thereby effectively preventing the circular block from accidentally sliding out of the circular slot.

For example, in the embodiment, as shown in FIG. 4, the width of the first square block 7 is less than the maximum width of the first circular block 9, and the width of the second square block 8 is less than the maximum width of the second circular block 11. Moreover, the width of the first square block 7 may match the width of the first narrow region 26 shown in FIG. 5, and the width of the second square block 8 may match the width of the second narrow region 27 shown in FIG. 5.

Optionally, the maximum width of the circular block may also be less than or equal to the width of the square block. Here, the connection between the circular block and the square block may be provided with a concave region whose width matches the width of the narrow region in the slot. Therefore, when the circular block at the end of the block slides to the circular slot at the end of the slot, the convex portion is opposite the concave region, and may completely or partially restore to the state before deformation in the space provided by the concave region. Similarly to the above example, a convex portion located in a concave region may restrict the circular block in the circular slot, so that a large external force is needed for the circular block to escape from the circular slot, thereby effectively preventing the circular block from accidentally sliding out of the circular slot.

For example, in the embodiment, the connection between the first square block 7 and the first circular block 9 may be provided with a first concave region, and the connection between the second square block 8 and the second circular block 11 may be provided with a second concave region, where the width of the first concave region is less than the width of the first square block 7, the width of the second concave region is less than the width of the second square block 8, and the width of the first concave region matches the width of the second concave region.

In some embodiments of the present disclosure, the outer end of the first square slot 4 extends from the peripheral surface of the second connector 6 to the middle of the second connector 6; the outer end of the second square slot 5 extends from the peripheral surface of the second connector 6 to the middle of the second connector 6. Based on this connecting structure, simply align the first square block 7 and the second square block 8 with the first square slot 4 and the second square slot 5 respectively, and push them in parallel to achieve the connection between the first connector 3 and the second connector 6, so that the connection between different components can be achieved, such as the connection between the column 1 and the panel 2.

For example, as shown in FIG. 5, an end of the first square slot 4 is open to the peripheral surface of the first connector 3, and the other end is connected to the first circular slot 10; Similarly, one end of the second square slot 5 is open to the peripheral surface of the first connector 3, and the other end is connected to the second circular slot 12. In the connecting structure, simply align the first circular block 9 and the second circular block 11 with the first square slot 4 and the second square slot 5 respectively, and push them in parallel until the first circular block 9 and the second circular block 11 enter the first circular slot 10 and the second circular slot 12, so that the connection between the first connector 3 and the second connector 6 can be completed.

In some optional embodiments of the present disclosure, as shown in FIG. 4, the outer end of the first square block 7 may be provided with a first convex portion 15, and the outer end of the second square block 8 may be provided with a second convex portion 17. Accordingly, as shown in FIG. 5, the outer end of the first square slot 4 may be provided with a first concave portion 16, and the outer end of the second square slot 5 may be provided with a second concave portion 18. When the first connector 3 and the second connector 6 are connected, the first convex portion 15 is abutted against the first concave portion 16, and the second convex portion 17 is abutted against the second concave portion 18. As a result, the concave portion can respectively limit the corresponding convex portions, so that the square block can be more accurately engaged with the square slot.

In some optional embodiments of the present disclosure, as shown in FIG. 3 and so on, the first connector 3 may also be provided with a third slot 19. Specifically, the third slot 19 may be located between the first square slot 4 and the second square slot 5, and the length of the third slot 19 is greater than the length of the first square slot 4 and the length of the second square slot 5. Correspondingly, as shown in FIG. 4 and so on, the second connector 6 may also be provided with a third block 20.

Specifically, the third block 20 is located between the first square block 9 and the second square block 11, and the length of the third block 20 is greater than the length of the first square block 9 and the length of the second square block 10. Here, the third block 20 is engaged with the third slot 19 when the first connector 3 and the second connector 6 are connected, so that the connection reliability between the two connectors can be further improved, thus further improving the connection reliability between the components of the cat furniture item.

Figure 7:
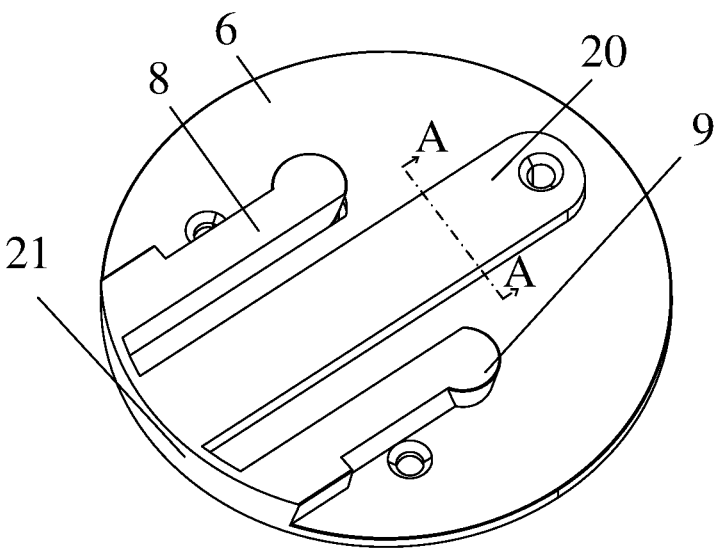
FIG. 7 is a schematic diagram of a second connector adapted to the first connector in FIG. 6.

In other embodiments of the present disclosure, as shown in FIGS. 7 and 8, the second connector 6 is also provided with a sealing portion 21, and the first connector 3 is provided with a sealing groove 30 that matches the sealing portion 21. The sealing groove 30 is used for inserting the sealing portion 21 therein.

Specifically, as shown in FIG. 7, the sealing portion 21 extends from the peripheral surface of the second connector 6 to the inner of the second connector 6, and each outer end of the first square block 7, the second square block 8, and the third block 20 extends from the inner surface of the sealing portion 21 to the middle of the second connector 6. Correspondingly, as shown in FIG. 8, the sealing groove 30 extends from the peripheral surface of the first connector 3 to the middle of the first connector 3, and each outer end of the first square slot 4, the second square slot 5, and the third slot 19 extends from the sealing groove 30 to the middle of the first connector 3.

In the embodiment, by setting a matched sealing portion and sealing groove on the two connectors respectively, the sealing portion is accommodated in the sealing groove when the two connectors are engaged and connected, and the outer surface of the sealing portion and the peripheral surface of the other connector are on the same circumferential surface, making the two connectors form a whole, thus improving the smoothness and aesthetics of the surface of connecting structure.

When the first connector 3 is connected to the second connector 6, the depth of the sealing groove 30 that is, the height difference between the bottom surface of the sealing groove 30 and the peripheral surface of the first connector 3 is greater than or equal to the thickness of the sealing portion 21, so that the sealing portion 21 can be accommodated in the sealing groove 30 and the outer surface of the sealing portion 21 and the peripheral surface of the first connector 3 are on the same circumferential surface.

Optionally, referring to FIG. 8, the third block 20 is configured with a T-shaped cross-sectional shape, and the third slot 19 is configured to match the third block 20 to engage with the third block 20.

According to this configuration, the connection strength between the first connector 3 and the second connector 6 can be greatly improved. Specifically, this configuration of the third block 20 can more effectively avoid the separation caused by the first connector 3 and second connector 6 moving away from each other, thereby combining the first and second square blocks 7, 8 and the first and second slots 4, 5, the connection strength of the first connector 3 and second connector 6 will be significantly improved.

Optionally, in some embodiments, as shown in FIG. 9, the outer end of the third slot 19 may be provided with a horn-shaped opening 22. Specifically, the horn-shaped opening 22 includes an opening portion 23 and a guide portion 24, and the width of the opening portion 23 gradually decreases as it approaches the guide portion 24. By setting a wider horn opening, it is easier for installers to align the block into the slot, thus improving assembly efficiency.

Furthermore, the opening portion 23 may also be arranged as the wall thickness gradually increases as it approaches the guide portion 24. As a result, the opening area of the slot at one end of the peripheral surface is further increased, so that a thicker block can also be easily pushed into the slot, thus improving assembly efficiency, and reducing component wear.

In addition, the end, that far away from the sealing portion 21, of the third block 20 of the second connector 6 may be provided with a circular chamfer. As a result, it is possible to better guide the third block 20 into the third slot 19, thus reducing the accuracy requirements for pre alignment, and further improving the ease of operation of the connecting structure.

In the connecting structure in any of the above embodiments or examples, optionally, the end surface of the first connector 3 may also be provided with a plurality of elastic sheets 25. Wherein the plurality of elastic sheets 25 are configured to exert pressure on the second connector 6 when the first connector 3 and the second connector 6 are connected, that is, to press against the second connector 6.

It should be understood that when the first connector 3 and the second connector 6 are connected, there may be a certain gap between the first connector 3 and the second connector 6. Therefore, by setting the plurality of elastic sheets 25 on the end surface of the first connector 3 and using the elastic sheets 25 to press against the second connector 6, so that the connection between the first connector 3 and the second connector 6 can be made more stable.

The connecting structure shown in FIGS. 12-27 are based on the second implementation of the present disclosure. The connecting structure in this implementation can be applied to the cat furniture item shown in FIG. 1 as the connecting structure therein.

Figure 16:
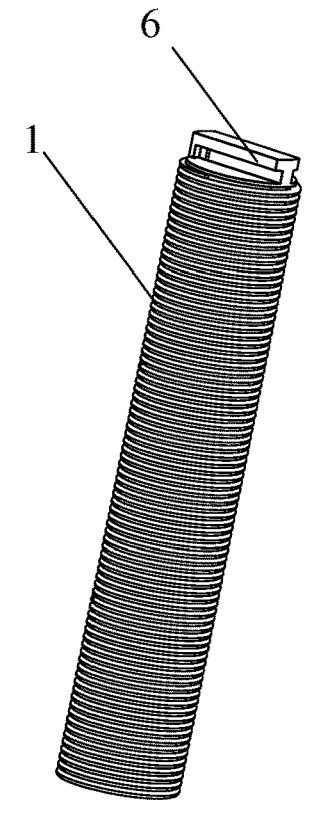
FIG. 16 is a schematic diagram of the second connector shown in FIG. 14 fixedly connected to an end surface of the column of the cat furniture item shown in FIG. 1.
Figure 17:
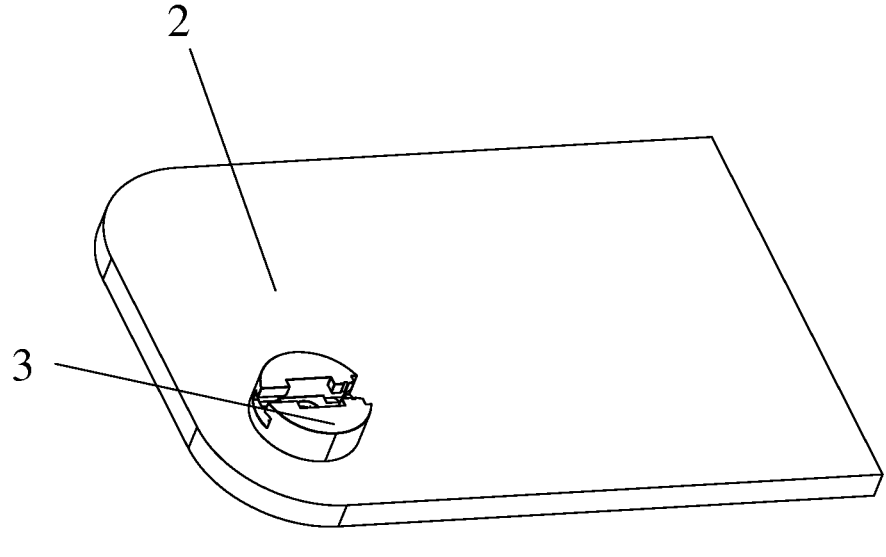
FIG. 17 is a schematic diagram of the first connector shown in FIG. 15 fixedly connected to the panel of the cat furniture item shown in FIG. 1.
Figure 18:
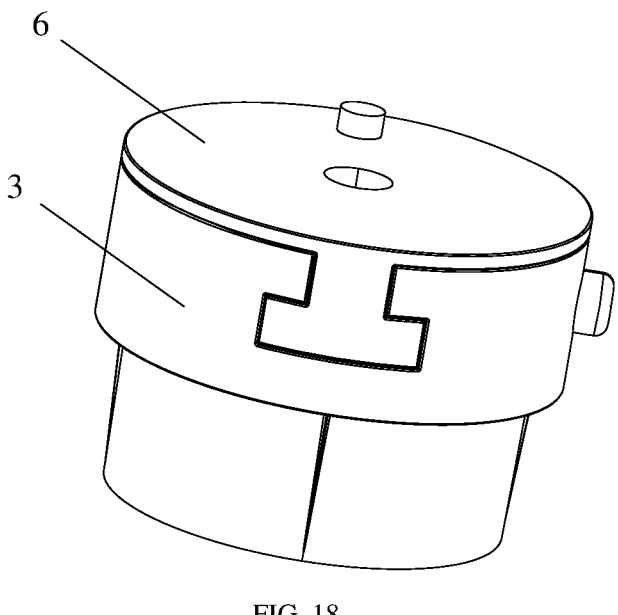
FIG. 18 is a schematic diagram of a connecting structure, for the cat furniture item shown in FIG. 1, according to another embodiment of the present disclosure.
Figure 19:
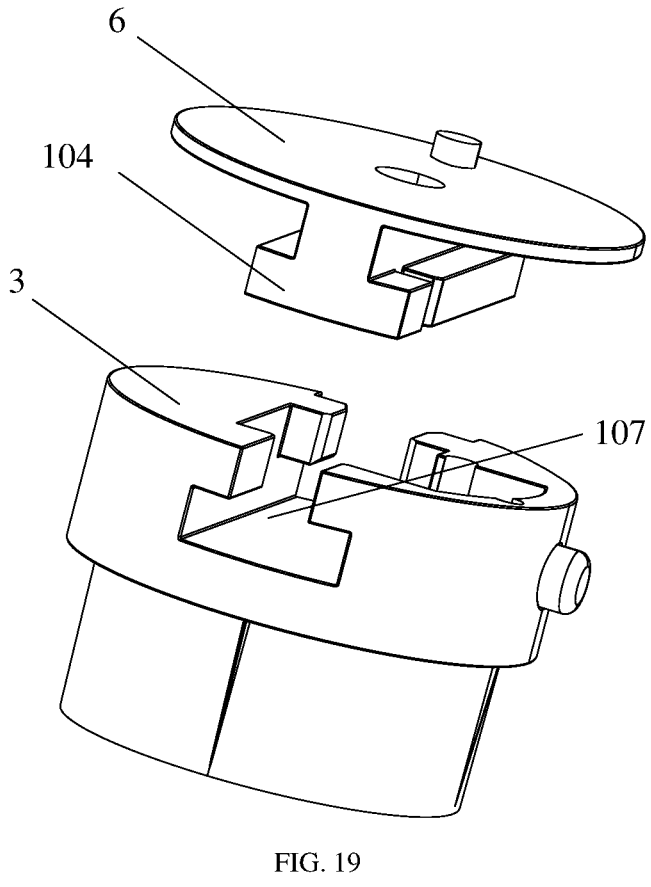
FIG. 19 is an exploded diagram of the connecting structure shown in FIG. 18.
Figure 24:
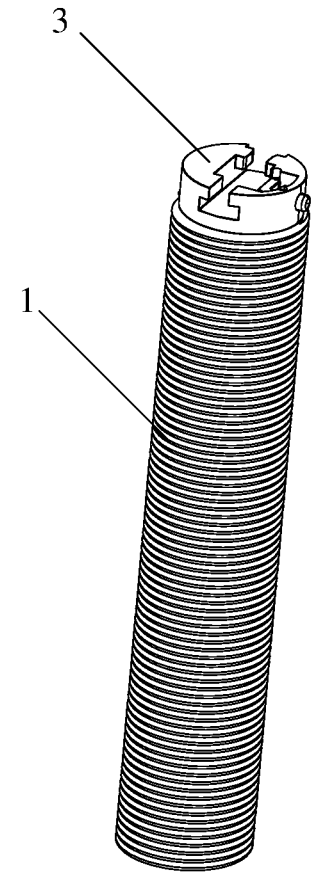
FIG. 24 is a schematic diagram of the first connector shown in FIG. 21 fixedly connected to the end surface of the column shown in FIG. 1.

For example, referring to the application scenario shown in FIG. 1, as shown in FIG. 16, the first connector 3 may be fixed to the end surface of the column 1, and the second connector 6 may be fixed to the panel 2; or as shown in FIG. 24, the first connector 3 may be fixed to the panel 2, and the second connector 6 may be fixed to the end surface of the column 1. Therefore, by connecting the first connector 3 and the second connector 6, the connection between the column 1 and the panel 2 can be achieved.

Figure 13:
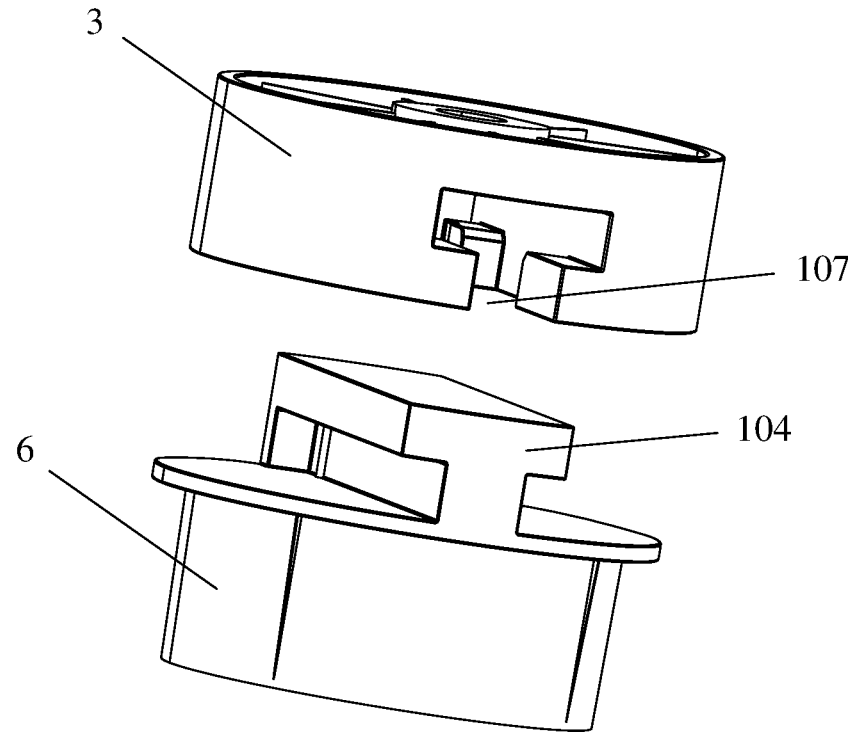
FIG. 13 is an exploded diagram of the connecting structure shown in FIG. 12.

In this implementation, as shown in FIG. 13 and so on, the at least one block of the second connector 6 includes a T-shaped block 104, and the at least one slot of the first connector 3 includes a slot 107 that matches the T-shaped block 104. The T-shaped block 104 is configured to be inserted into the slot 107 to engage with the slot 107.

Figure 14:
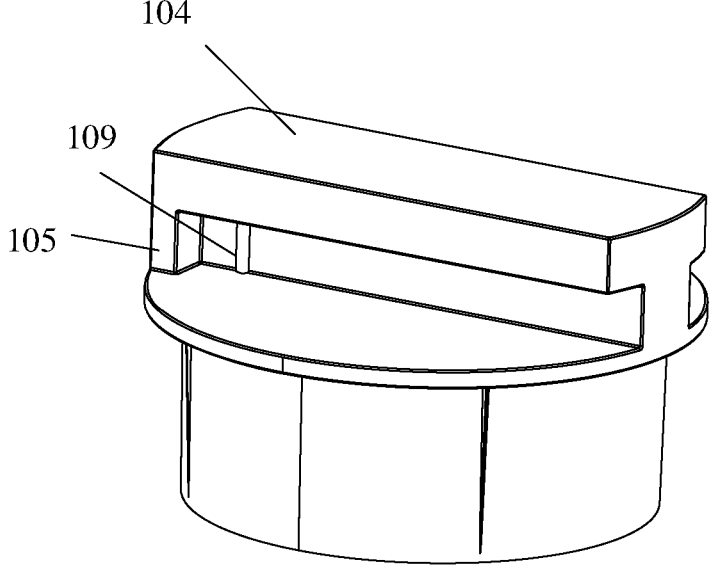
FIG. 14 is a schematic diagram of a second connector of the connecting structure in FIG. 12.
Figure 15:
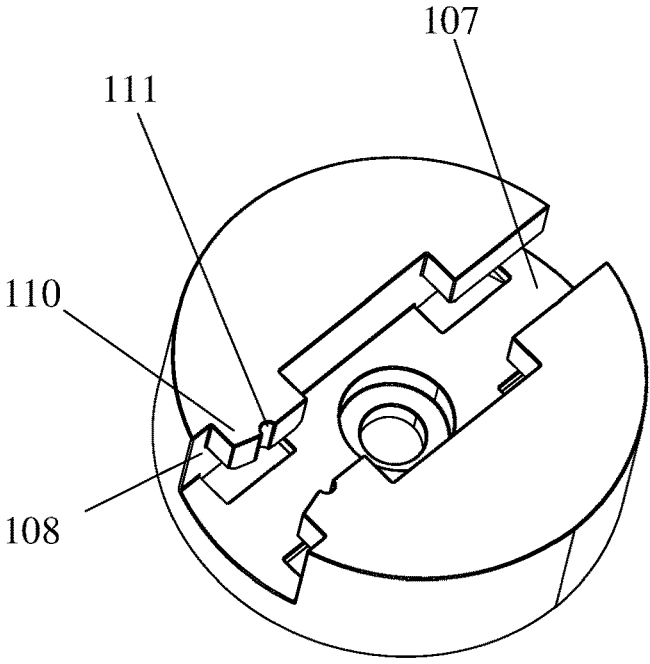
FIG. 15 is a schematic diagram of a first connector of the connecting structure in FIG. 12.

Furthermore, as shown in FIG. 14, one end of the T-shaped block 104 may be provided with a stop block 105. Correspondingly, as shown in FIG. 15, the second connector 6 is also provided with a stop groove 108 located at one end of the slot 107, and the stop block 105 is configured to be inserted into the stop groove 108.

Based on this connecting structure, by pushing the T-shaped block 104 into the slot 107 until the stop block 105 is inserted into the stop groove 108 when it is necessary to connect the column 1 and the panel 2, the assembly convenience of various components of the cat furniture item can be greatly improved. And by pushing the T-shaped block 104 out of the slot 107 to separate the column 1 and the panel 2 when disassembling, the efficiency of disassembly and assembly can be greatly improved.

In some embodiments, as shown in FIG. 14, the T-shaped block 104 may be provided with a protrusion 109. Accordingly, as shown in FIG. 15, the slot 107 may be provided with a convex portion 110, and the convex portion 110 may be provided with a groove 111. Where the protrusion 109 is configured to be placed within the groove 111 to engage with the groove 111. Therefore, when the first connector 3 and the second connector 6 are engaged and connected, the protrusion 109 is engaged in the groove 111, so that the reliability of connection between components can be further improved.

Figure 20:
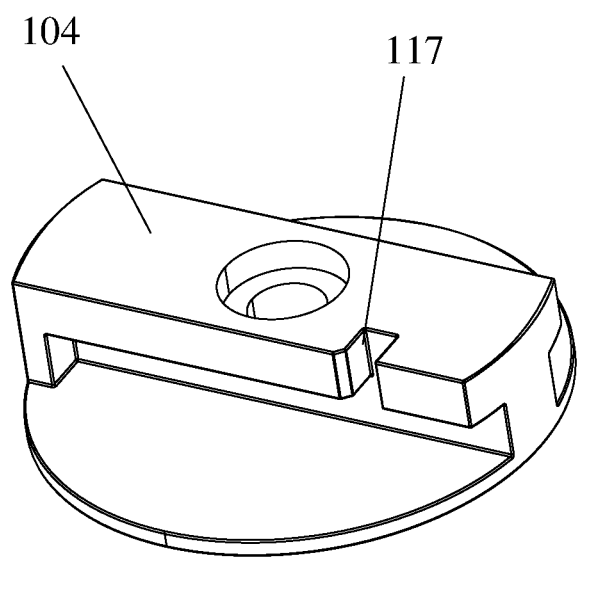
FIG. 20 is a schematic diagram of a second connector of the connecting structure shown in FIG. 18.
Figure 21:
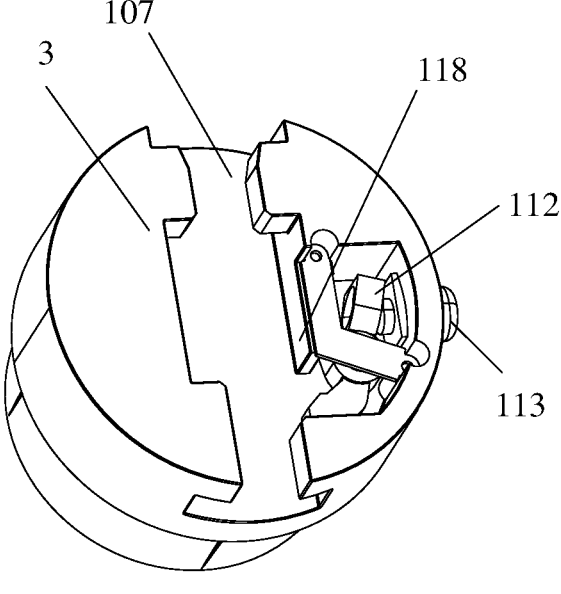
FIG. 21 is a schematic diagram of a first connector of the connecting structure shown in FIG. 18.
Figure 22:
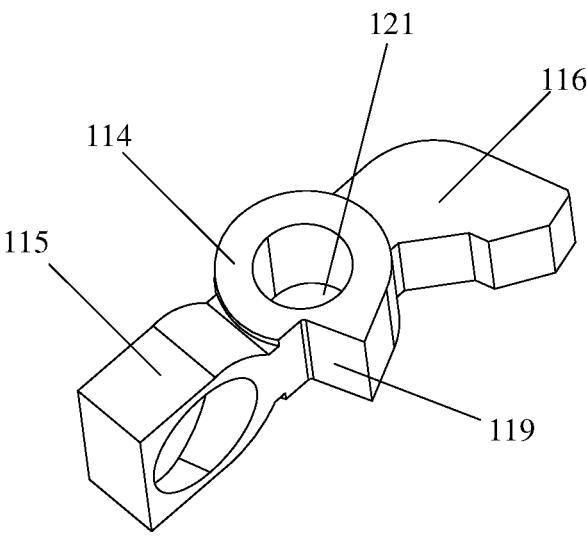
FIG. 22 is a schematic diagram of a lock catch of the first connector shown in FIG. 21.
Figure 23:
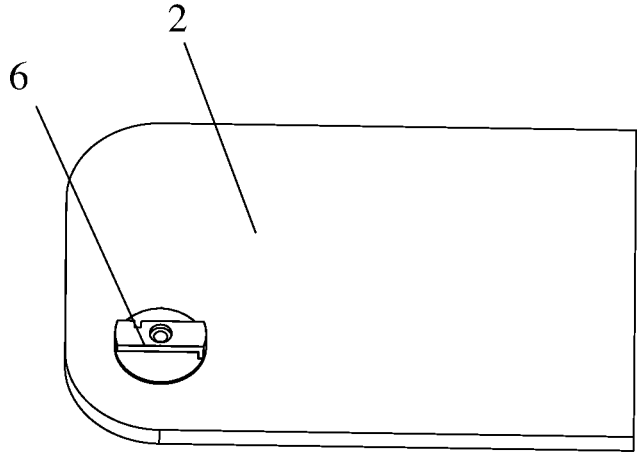
FIG. 23 is a schematic diagram of the second connector shown in FIG. 20 fixedly connected to the panel of the cat furniture item shown in FIG. 1.

Optionally, in some embodiments, the first connector 3 may be provided with a clamping assembly. Specifically, as shown in FIG. 21, the clamping assembly may include a lock catch 112 and a button 113. As shown in FIG. 22, the lock catch 112 may include a rotating portion 114, a pushing portion 115, and a locking portion 116. The rotating portion 114 is rotatably supported, and the pushing portion 115 and the locking portion 116 are respectively fixed to both sides of the rotating portion 114. The button 113 is slidably connected to the first connector 3, an end of the button 113 is connected to the pushing portion 115, and the other end of the button 113 passes through the first connector 3 and extends to the outside of the first connector 3. As shown in FIG. 20, the T-shaped block 104 may be provided with a concave portion 117, and the locking portion 116 of the lock catch 112 is configured to be clamped within the concave portion 117 to prevent the T-shaped block 104 from sliding out of the slot 107.

Optionally, the first connector 3 may be provided with a rotation shaft. Accordingly, the rotation portion 114 may be provided with a rotation hole 121. The rotation shaft may be inserted into the rotation hole 121 to make the rotating portion 114 rotatable relative to the rotation shaft.

In this embodiment, the installers can press the button 113 when it is necessary to connect the column 1 and the panel 2, the button 113 in the pressed state may drive the pushing portion 115 of the lock catch to rotate around the rotating portion 114, and drive the locking portion 116 to move towards the concave portion 117 of the T-shaped block 104. When the locking portion 116 is fully moved into the concave portion 117, the locking portion 116 is clamped into the concave portion 117. When disassembly is required, simply pull out the button 113 in the reverse direction to drive the locking portion 116 away from the concave portion 117, and when the locking portion 116 completely leaves the concave portion 117, the column 1 and panel 2 can be disassembled.

Furthermore, as shown in FIG. 21, the locking assembly may also include a stopper 118 fixed to the first connector 3. Accordingly, the rotating portion 114 may be provided with a blocking portion 119, and the blocking portion is abutted against the stopper 118. As a result, the blocking portion 119 can limit the rotation range of the rotation portion 114, so that the rotation portion 114 should rotate within a certain angle range.

Optionally, in some embodiments, the first connector 3 is rotatably connected to the column 1 when the first connector 3 is set on the column 1. When the column 1 is connected to the panel 2, the first connector 3 may be rotatably connected to the column 1. Therefore, by rotating the first connector 3, the slot 107 may be aligned with the T-shaped block 104 of the second connector 6, and further pushed the T-shaped block 104 into the slot 107, so that the connection of the column 1 and the panel 2 can be achieved through a simple operation.

Figure 25:
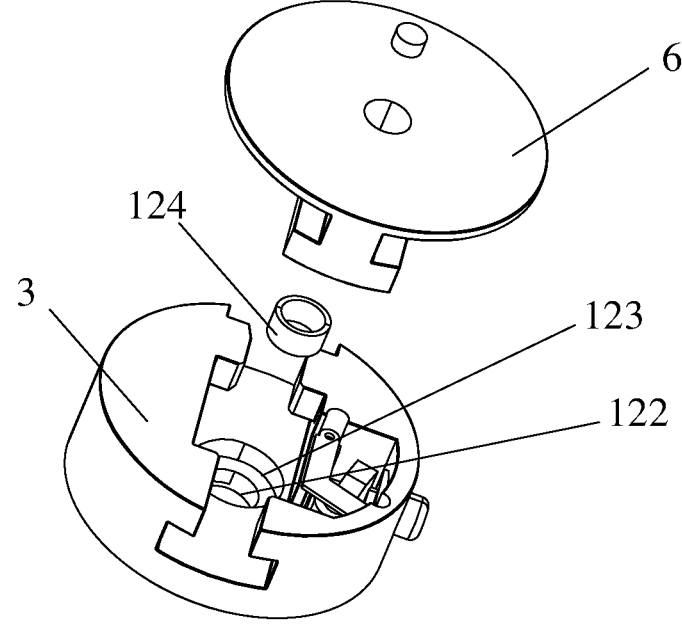
FIG. 25 is an exploded diagram of the connecting structure shown in FIG. 18.

Specifically, as a preferred method, as shown in FIG. 25, the slot 107 is provided with a circular hole 122. Where the circular hole 122 is provided with a step groove 123, and the step groove 123 is provided with a circular ring 124. The circular ring 124 is fixed to the column 1 by a bolt passing through the circular ring 124 and the circular hole 122, so that the first connector 3 is rotatably connected to the circular ring 124.

In some optional embodiments of this implementation, the connecting structure may also include a locking assembly.

Figure 26:
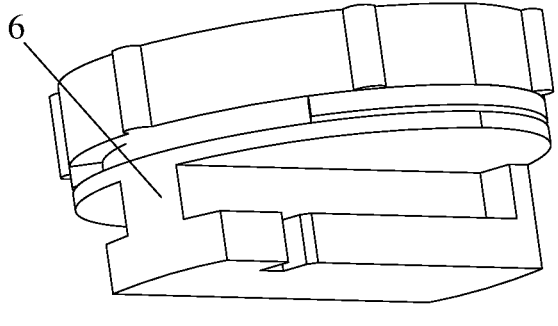
FIG. 26 is a schematic diagram of a second connector with a locking assembly according to another embodiment of the present disclosure.
Figure 27:
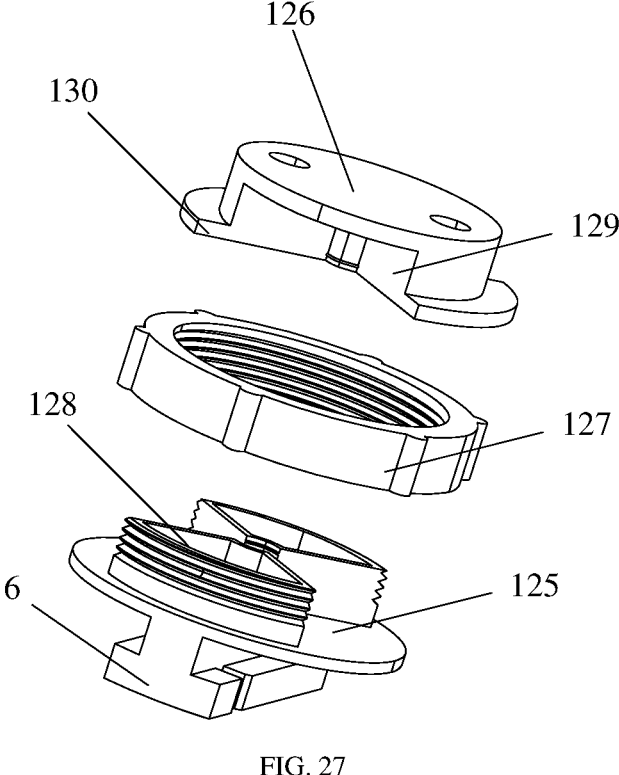
FIG. 27 is an exploded diagram of the second connector with the locking assembly shown in FIG. 26.
Figure 28:
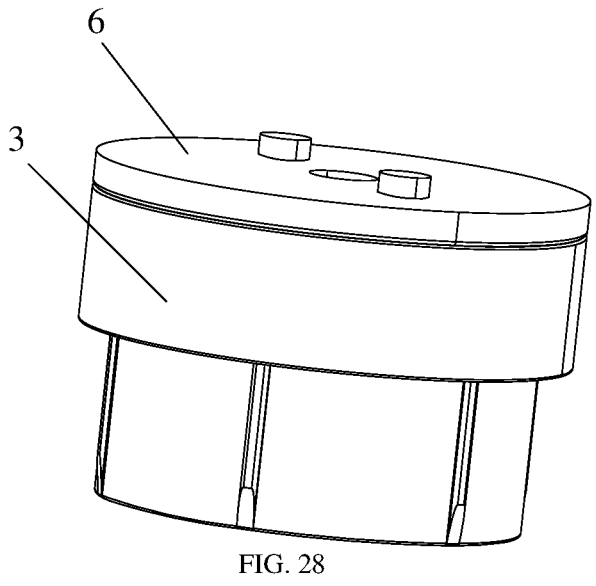
FIG. 28 is a schematic diagram of a connecting structure, for the cat furniture item shown in FIG. 1, according to another implementation of the present disclosure.

As shown in FIGS. 26 and 27, the locking assembly includes a first connection block 125, a second connection block 126, and a locking block 127. The first connection block 125 is configured to be fixed to the second connector 6, and the first connection block 125 is provided with a pair of first sector blocks 128 which are oppositely disposed. The second connecting block 126 is configured to be fixed to one of the end surface of the column 1 or the panel 2. The second connecting block 126 is provided with a pair of second sector blocks 129 which are oppositely disposed. The pair of first sector blocks 128 and the pair of second sector blocks 129 can be assembled into a cylinder. A peripheral side of the pair of second sector blocks 129 are provided with a flange 130, the locking block 127 is screwed to an outer side of the pair of first sector blocks 128, and a bottom of the locking block 127 is abutted against a side of the flange 130.

According to the connecting structure in this embodiment, when the second connector 6 is fixedly connected to the panel 2 (or the end surface of the column 1), the first connecting block 125 can be fixed to the panel 2 (or the end surface of the column 1) by screwing the locking block 127, thus facilitating the assembly and disassembly between second connector 6 and the panel 2 (or the end surface of the column 1).

The connecting structure shown in FIGS. 28-33 are based on the third implementation of the present disclosure. The connecting structure in this implementation can be applied to the cat furniture item shown in FIG. 1.

Figure 32:
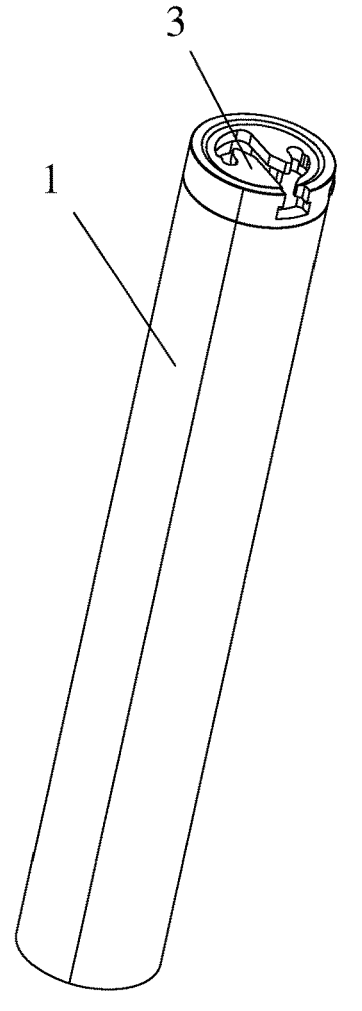
FIG. 32 is a schematic diagram of the first connector shown in FIG. 30 fixedly connected to an end surface of the column of the cat furniture item shown in FIG. 1.
Figure 33:
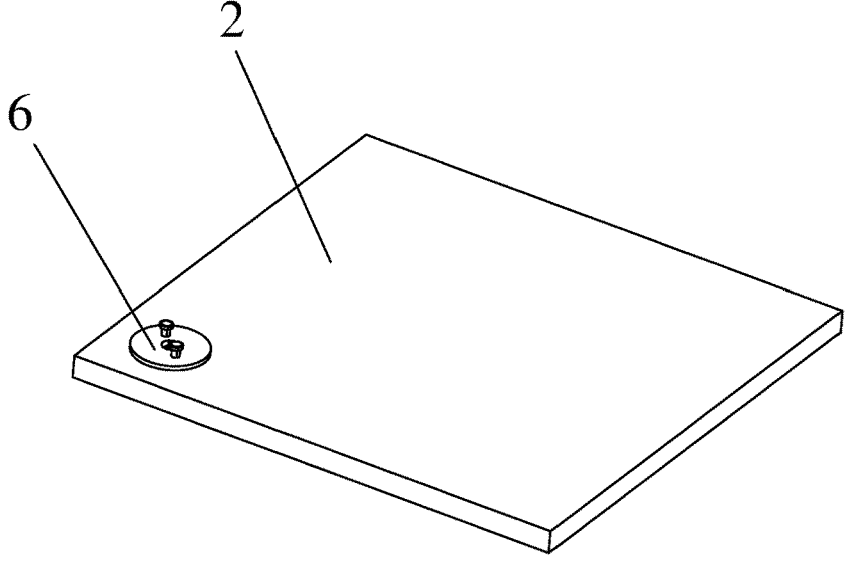
FIG. 33 is a schematic diagram of a second connector shown in FIG. 31 fixedly connected to the panel of the cat furniture item shown in FIG. 1.

For example, referring to the application scenarios shown in FIG. 1, as shown in FIG. 32 and FIG. 33, the first connector 3 may be fixed to the end surface of the column 1, and the second connector 6 may be fixed to the panel 2; or the first connector 3 may be fixed to the panel 2, and the second connector 6 may be fixed to the end surface of the column 1. Therefore, by connecting the first connector 3 and the second connector 6, the connection between the column 1 and the panel 2 can be achieved.

Figure 29:
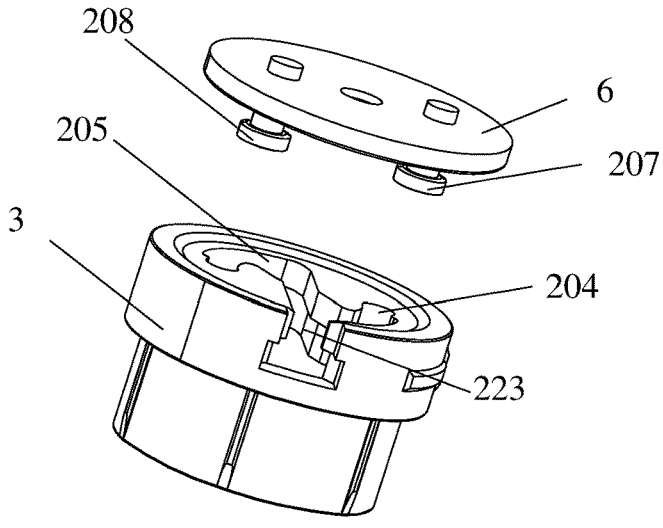
FIG. 29 is an exploded diagram of the connecting structure shown in FIG. 28.

In this implementation, as shown in FIG. 29, the at least one slot of the first connector 3 includes a first arc-shaped slot 204 and a second arc-shaped slot 205, and the first arc-shaped slot 204 and the second arc-shaped slot 205 are oppositely disposed; Correspondingly, the at least one block of the second connector 6 includes a first block 207 and a second block 208. The first block 207 is inserted into the first arc-shaped slot 204 to engage with the first arc-shaped slot 204, and the second block 208 is inserted into the second arc-shaped slot 205 to engage with the second arc-shaped slot 205.

Based on this connecting structure, by screwing the first block 207 and the second block 208 into the first arc-shaped groove 4 and the second arc-shaped groove 5 respectively, the connection between the column 1 and the panel 2 can be achieved, so that the convenience of assembly between the column 1 and the panel 2 can be improved. And it is only necessary to push and rotate the first block 207 and the second block 208 out of the first arc-shaped groove 4 and the second arc-shaped groove 5 when disassembling, the efficiency of disassembly and assembly can be greatly improved. In addition, since additional fixing mechanisms such as screws are not required to fix the column 1 and the panel 2, accidental injury caused by exposure of screws after long-term use can be avoided.

In addition, by disposing the first arc-shaped groove 4 and the second arc-shaped groove 5 opposite each other, a firm connection between the column 1 and the panel 2 can be ensured.

Figure 30:
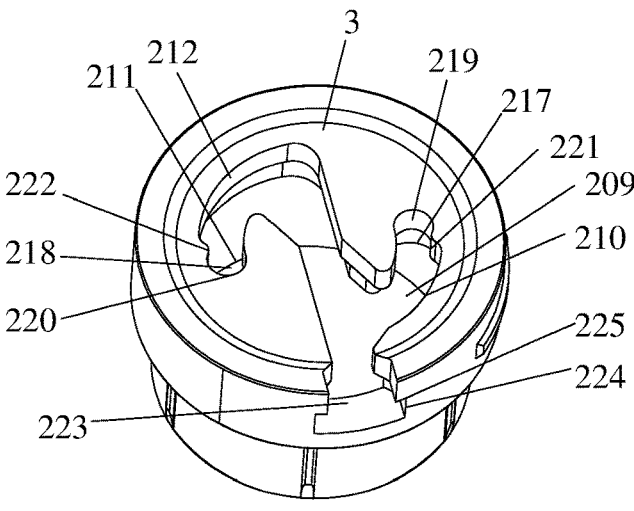
FIG. 30 is a schematic diagram of a first connector of the connecting structure in FIG. 28.
Figure 31:
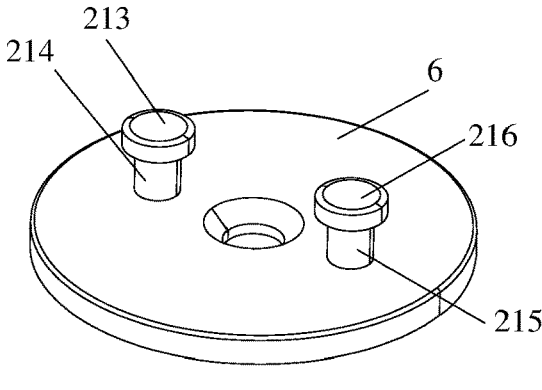
FIG. 31 is a schematic diagram of a second connector of the connecting structure in FIG. 28.

Furthermore, in some embodiments, as shown in FIG. 30, in the first connector 3, the first arc-shaped slot 204 may include a first guide groove 209 and a first flange 210, and the second arc-shaped slot 205 may include a second guide groove 211 and a second flange 212. As shown in FIG. 31, in the second connector 6, the first block 207 includes a first connecting block 214 and a first bump 213, and the second block 208 includes a second connecting block 215 and a second bump 216. The first bump 214 is inserted into the first guide groove 209 to engage with the first guide groove 209, and the second bump 216 is inserted into the second guide groove 211 to engage with the second guide groove 211.

In the connecting structure, the first bump 214 and the second bump 216 are inserted into the first guide groove 209 and the second guide groove 211 respectively. The first flange 210 prevents the first bump 214 from sliding out of the first guide groove 209 to ensure that the first bump 214 is firmly engaged in the first guide groove 209, and the second flange 212 prevents the second bump 216 from sliding out of the second guide groove 211 to ensure that the second bump 216 is firmly engaged in the second guide groove 211, so that the stability of the connection between various components of a cat furniture item can be ensured.

Furthermore, in some embodiments, as shown in FIG. 30, the end of the first arc-shaped slot 204 is provided with a first circular groove 217, and the end of the second arc-shaped slot 205 is provided with a second circular groove 218. The first arc-shaped slot 204 is connected to the first circular groove 217, and the second arc-shaped slot 205 is connected to the second circular groove 218. The first bump 214 is inserted into the first circular groove 217 to engage with the first circular groove 217, and the second bump 216 is inserted into the second circular groove 218 to engage with the second circular groove 218.

In this connecting structure, the first bump 214 is inserted into the first circular groove 217 at the end of the first arc-shaped groove 4, so that the first block 207 and the first arc-shaped groove 4 can be further firmly engaged. Similarly, the second bump 216 is inserted into the second circular groove 218 at the end of the second arc-shaped groove 5, so that the second block 208 and the second arc-shaped groove 5 can be further firmly engaged. Therefore, it is possible to further improve the stability of the connection between various components in the cat furniture item.

Furthermore, in some embodiments, as shown in FIG. 30, the first circular groove 217 is provided with a first stop portion 219, and the second circular groove 218 is provided with a second stop portion 220. In the connected state, the first bump 214 is abutted against the first stop portion 219, and the second bump 216 is abutted against the second stop portion 220.

In this connecting structure, the first stop portion 219 on the first circular groove 217 may effectively prevent the first bump 214 from sliding out of the first circular groove 217, and the second stop portion 220 on the second circular groove 218 may effectively prevent the second bump 216 from sliding out of the second circular groove 218, so that the stability of the connection between various components in the cat furniture item can be further improved.

Furthermore, in some embodiments, as shown in FIG. 30, the connection between the first arc-shaped slot 204 and the first circular groove 217 is provided with a first convex portion 221, and the connection between the second arc-shaped slot 205 and the second circular groove 218 is provided with a second convex portion 222. Preferably, the first convex portion 221 may be provided with a circular chamfer, and the second convex portion 222 may also be provided with a circular chamfer, so as to facilitate the pushing and clamping of the first bump 214 and the second bump 216 into the first circular groove 217.

Optionally, as shown in FIG. 30, the first connector 3 is also provided with a guide groove 223, the guide groove 223 is connected to both the first arc-shaped slot 204 and the second arc-shaped slot 205.

Optionally, as shown in FIG. 30, the first connector 3 may also be provided with a guide opening 224 that is connected to the guide groove 223.

In this connecting structure, when the column 1 is connected to the panel 2, the first block 207 and the second block 208 can enter the guide groove along the guide opening 224, slide into the first arc-shaped groove 4 and the second arc-shaped groove 5, and engage with the first arc-shaped groove 4 and the second arc-shaped groove 5.

Preferably, as shown in FIG. 30, the guide groove 223 may be provided with a third flange 225. In this connecting structure, when the first block 207 and the second block 208 slide into the first arc-shaped groove 4 and the second arc-shaped groove 5 along the guide groove, the third flange 225 can effectively prevent the first block 207 and the second block 208 from sliding out of the guide groove.

The present disclosure also provides a cat furniture item, as shown in FIG. 1. the cat furniture item may include a column 1, a panel 2, and a connecting structure in any of the above implementations, embodiments, or examples.

The above is only preferred embodiments of the present disclosure and is not intended to limit the protection scope of the present disclosure. Any modification, equivalent replacement, improvement and so on made within the spirit and principles of the present disclosure shall fall into the protection scope of the present disclosure.

What is claimed is:

1. A connecting structure for a cat furniture item, wherein the cat furniture item comprises the connecting structure, a column, and a panel, and the connecting structure comprises:

a first connector, configured to be fixed to one of the panel and an end surface of the column, and provided with at least one slot; and a second connector, configured to be fixed to the other of the panel and the end surface of the column, and provided with at least one block, wherein the at least one block is configured to engage with the at least one slot respectively to achieve a detachable connection between the first connector and the second connector, the at least one slot comprises a first square slot and a second square slot disposed at an interval and a third slot located between the first square slot and the second square slot, and a length of the third slot is greater than a length of the first square slot and a length of the second square slot;

the at least one block comprises a first square block and a second square block disposed at an interval and a third block located between the first square block and the second square block, and a length of the third block is greater than a length of the first square block and a length of the second square block;

the first square block is configured to be inserted into the first square slot to engage with the first square slot, and the second square block is configured to be inserted into the second square slot to engage with the second square slot, the third block is configured to have a cross-sectional shape of T, and the third slot is configured to fit with the third block to engage with the third block.

2. The connecting structure according to claim 1, wherein the first square slot is in a wedge shape with a gradually decreasing width from a bottom thereof to a top thereof;

the first square block is in a wedge shape with a gradually increasing width from a bottom thereof to a top thereof to fit into the first square slot;

the second square slot is in a wedge shape with a gradually decreasing width from a bottom thereof to a top thereof; and the second square block is in a wedge shape with a gradually increasing width from a bottom thereof to a top thereof to fit into the second square slot.

3. The connecting structure according to claim 2, wherein the at least one block further comprises a first circular block and a second circular block, the first circular block is located at an inner end of the first square block, and the second circular block is located at an inner end of the second square block;

the at least one slot further comprises a first circular slot and a second circular slot, the first circular slot is located at an inner end of the first square slot, and the second circular slot is located at an inner end of the second square slot; and the first circular block is configured to be inserted into the first circular slot to engage with the first circular slot; and the second circular block is configured to be inserted into the second circular slot to engage with the second circular slot.

4. The connecting structure according to claim 3, wherein a first narrow region is provided at a joint between the first square slot and the first circular slot, and the first narrow region is provided with a first convex portion configured to make the first narrow region narrower than the first square slot and the first circular slot; and a second narrow region is provided at a joint between the second square slot and the second circular slot, and the second narrow region is provided with a second convex portion configured to make the second narrow region narrower than the second square slot and the second circular slot.

5. The connecting structure according to claim 4, wherein the first connector is further provided with a first weakening portion and a second weakening portion, the first weakening portion is a first weakening hole or a first weakening groove, and the second weakening portion is a second weakening hole or a second weakening groove;

the first weakening portion is adjacent to the first convex portion, so that the first convex portion is easily deformed when pressed by the first circular block sliding from the first square slot to the first circular slot; and the second weakening portion is adjacent to the second convex portion, so that the second convex portion is easily deformed when pressed by the second circular block sliding from the second square slot to the second circular slot.

6. The connecting structure according to claim 5, wherein the first connector is further provided with a first narrow groove and a second narrow groove, the first narrow groove extends from the first weakening portion to the first circular slot; and the second narrow groove extends from the second weakening portion to the second circular slot.

7. The connecting structure according to claim 1, wherein an outer end of the first square block is provided with a first convex portion, an outer end of the first square slot is provided with a first concave portion, and the first convex portion is configured to abut against the first concave portion; and an outer end of the second square block is provided with a second convex portion, an outer end of the second square slot is provided with a second concave portion, and the second convex portion is configured to abut against the second concave portion.

8. The connecting structure according to claim 1, wherein the second connector is further provided with a sealing portion, the sealing portion extends inwards from a peripheral surface of the second connector, and each outer end of the first square block, the second square block, and the third block extends inwards from an inner surface of the sealing portion;

the first connector is provided with a sealing groove, the sealing groove extends inwards from a peripheral surface of the first connector, and each outer end of the first square slot, the second square slot, and the third slot extends inwards from the sealing groove; and the sealing groove is configured to fit into the sealing portion, such that the sealing portion is capable of being inserted into the sealing groove.

9. The connecting structure according to claim 1, wherein an outer end of the third slot is provided with a horn-shaped opening, the horn-shaped opening comprises an opening portion and a guide portion, and a width of the opening portion gradually decreases towards the guide portion.

10. The connecting structure according to claim 9, wherein a wall thickness of the opening portion gradually increases towards the guide portion.

11. The connecting structure according to claim 1, wherein an end surface of the first connector is provided with a plurality of elastic sheets, and the plurality of elastic sheets are configured to press against the second connector when the first connector and the second connector connect.

12. A cat furniture item, comprising: a column, a panel, and the connecting structure according to claim 1, wherein the connecting structure is used to connect the column to the panel.

* * * * *